(12) United States Patent
Boyd et al.

(10) Patent No.: US 7,581,480 B1
(45) Date of Patent: Sep. 1, 2009

(54) DISTRIBUTED GROUND-BASED THREAT DETECTION SYSTEM

(75) Inventors: Mallory John Boyd, Ridgecrest, CA (US); Jason R. Allen, Ridgecrest, CA (US); William Rodney Ditzler, Ridgecrest, CA (US); Richard James Busse, Camarillo, CA (US); Michael Dennis Barrett, Camarillo, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/392,608

(22) Filed: Feb. 25, 2009

Related U.S. Application Data (62) Division of application No. 11/879,524, filed on Jun. 25, 2007.

(51) Int. Cl.
  *B64D 1/04* (2006.01)
  *F41F 3/04* (2006.01)
  *G01N 33/22* (2006.01)
  *G01C 21/02* (2006.01)

(52) U.S. Cl. ............................... 89/1.1; 89/1.11; 89/1.8; 89/28.2; 89/41.01; 73/35.14; 73/35.16; 382/103; 250/203.6; 250/203.7; 250/206.1; 250/206.2

(58) Field of Classification Search .................... 89/1.1, 89/1.11, 1.8, 28.2, 41.01; 73/35.14, 35.16; 382/103; 250/203.6, 203.7, 206.1, 206.2
See application file for complete search history.

(56) References Cited

U.S. PATENT DOCUMENTS

| | | | | |
|---|---|---|---|---|
| 5,815,590 | A * | 9/1998 | Buttner et al. | 382/103 |
| 6,738,012 | B1 * | 5/2004 | Kirkpatrick | 342/67 |
| 6,977,598 | B2 * | 12/2005 | Longbottom | 340/945 |
| 6,980,152 | B2 * | 12/2005 | Steadman et al. | 342/14 |
| 7,205,520 | B1 * | 4/2007 | Busse et al. | 250/203.6 |
| 7,230,221 | B2 * | 6/2007 | Busse et al. | 250/203.6 |
| 7,420,195 | B2 * | 9/2008 | Cerwin et al. | 250/554 |
| 2006/0284050 | A1 * | 12/2006 | Busse et al. | 250/203.1 |

* cited by examiner

*Primary Examiner*—Bret Hayes
*Assistant Examiner*—Michael D David
(74) *Attorney, Agent, or Firm*—David S. Kalmbaugh (57) ABSTRACT

A distributed ground sensor threat detection system, which is an automated missile warning system designed to provide reliable, timely and accurate missile location information of shoulder-launched SAMs within the volume under surveillance by a network of sensors. Remote sensor nodes position in proximity to an airport runway monitor the area between the nodes to locate threat missiles. Detection information from each remote sensor node is sent to a central processing node which processes the information to determine if a threat missile is launched against a commercial aircraft.

20 Claims, 5 Drawing Sheets

DISTRIBUTED GROUND-BASED THREAT DETECTION SYSTEM

This application is a divisional application of application Ser. No. 11/879,524, filed Jun. 25, 2007.

BACKGROUND OF THE INVENTION

1. Field of the Invention

The present invention relates generally to aircraft takeoff and landing systems. More particularly, the present invention relates to a ground-based detection system which senses the firing of a shoulder launched missile or similar weapons system at an aircraft during takeoff and landing.

2. Description of the Prior Art

The recent FBI warnings concerning threats to civil aircraft from shoulder launched infrared missiles has caused concern among government agencies about the consequences of such an attack. The consequences of this type of attack on civilian aircraft would include a significant loss of life, that is several hundred innocent victims in the air and on the ground; a total disruption of air traffic; and a significant setback to the U.S. economy and the economy of our allies. If such attack were to occur and be successful it could have the same impact as the attack on the World Trade Center in New York city on Sep. 11, 2001.

Currently deployed missile countermeasure systems are self-contained, autonomous units installed on, and protecting, individual military aircraft. These countermeasure systems are expensive due to their complexity and the cost of hardware installed on each individual military aircraft. These countermeasure systems often require specialized training of the aircraft pilots to effectively use the systems to prevent a successful attack on an aircraft. Defense systems of this type are not practical for use in commercial aircraft.

Accordingly, there is a need for a cost effective, highly reliable and user friendly anti-missile system to protect aircraft which makes use of available sensor technology and which is relatively easy to deploy at large airports as well as smaller rural airfields.

SUMMARY OF THE INVENTION

The Distributed Ground-Based Threat Detection System comprising the present invention is an automated missile warning system, which is designed to provide a reliable, timely and accurate missile location of a shoulder-launched surface-to-air (SAM) missile within a volume under surveillance by using a network/grid of sensor nodes. The sensor nodes are positioned in the vicinity of a takeoff or landing flight path of an aircraft at an airport such that the area requiring surveillance is viewable by at least two sensors in the gird.

Each node has at least one and generally more than one optical sensor viewing and monitoring a defended area between adjacent nodes. The video data generated by each sensor is processed by computer software in the following four steps:

1. Multi-frame change detection is used by the software to detect moving objects, such as a SAM. The moving objects pixel coordinates are then converted to sightlines in a common globally referenced coordinate system. In this form, data from a remote node is sent to a central node by a high-bandwidth network link.

2. The computer software then searches for intersections between moving object sightlines from different nodes.

3. There is a generation of fused track files from single-frame intersections with a multisensor/multitarget tracker.

4. Threat declaration is provided by comparing track dynamics with missile flight profiles.

The grid of networked ground-based sensors for missile-launch detection and localization, is then used either to trigger release of countermeasures by the aircraft under attack, or to cue a ground-based countermeasure system to defeat the missile.

DETAILED DESCRIPTION OF A PREFERRED EMBODIMENT

Figure 1:
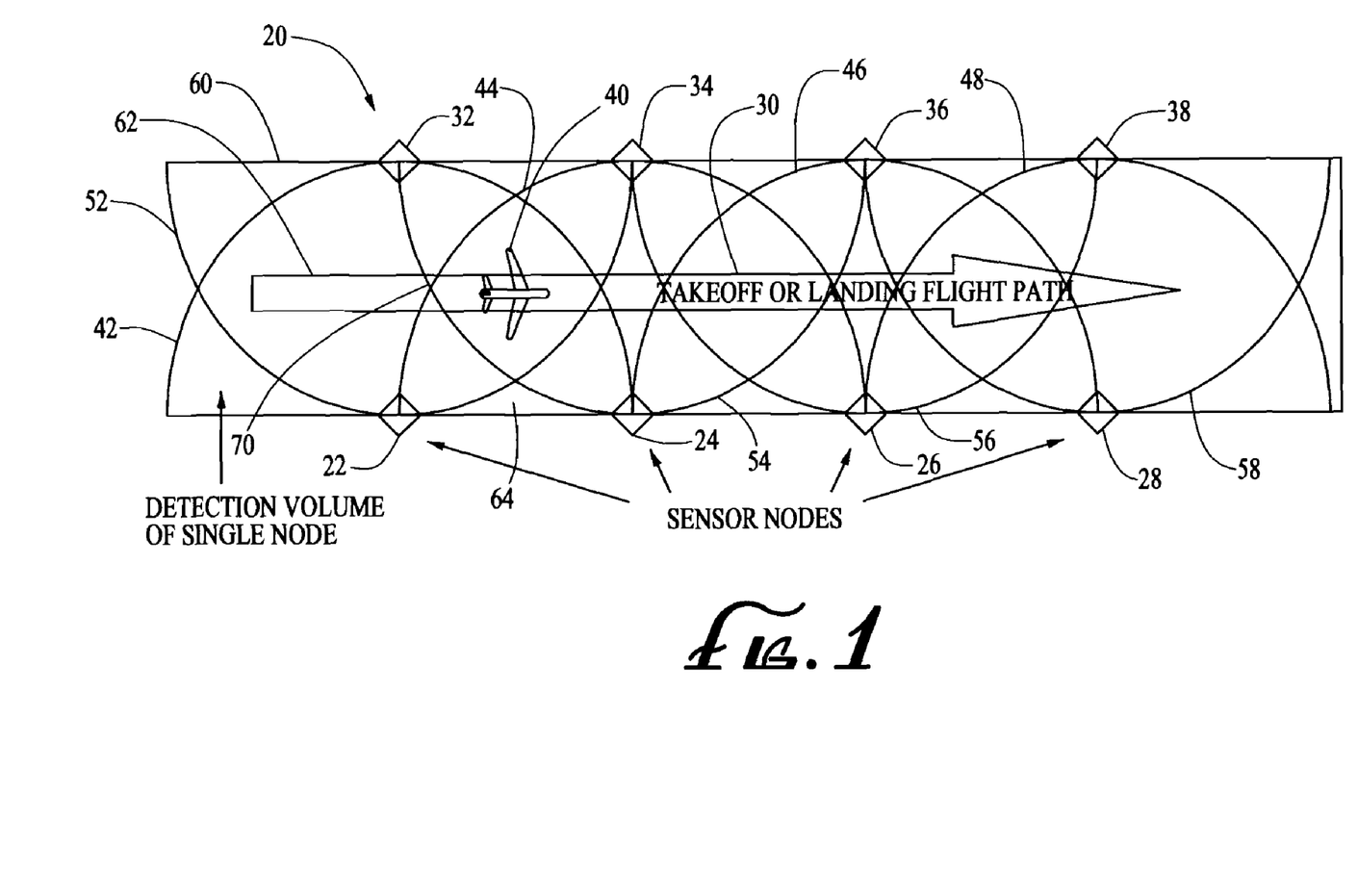
FIG. 1 illustrates a grid system of sensor nodes which is used to detect the launching of a shoulder-fired missile at an aircraft during takeoff or landing of the aircraft comprising a preferred embodiment of the present invention.

Referring to FIG. 1, there is shown a ground-based sensor system or grid 20 comprising four sensor nodes 22, 24, 26 and 28 positioned on the right side of an aircraft takeoff and landing path 30 and four sensor nodes 32, 34, 36 and 38 positioned on the left side of an aircraft takeoff and landing path 30 in the direction of flight of aircraft 40. Each sensor node 22, 24, 26, 28, 32, 34, 36 and 38 has a coverage area, that is an area in which the individual sensor can monitor path 30 and airspace surrounding the path 30 to determine if there is a threat missile launched against aircraft 40. The threat may be any shoulder-launched missile which is used in war to destroy enemy aircraft.

Several shoulder-fired SAMs used to destroy aircraft are currently available on the global black market including the U.S. made Stinger and the Russian SA-7, SA-14, SA-16, and SA-18 missiles. All missiles are lock-on-before-launch, with passive infrared guidance. Missile flight has three phases. During the first phase, an ejector motor burns for a small fraction of a second to propel the missile 5 to 10 meters away from the launch tube. This is followed by a second phase during which the ignition of the boost motor occurs providing high acceleration for 1 to 2 seconds. During the third phase, the motor transitions to a lower-thrust sustainer phase. The following Table summarizes the kinematic performance of a typical shoulder-fired SAM.

TABLE I

Typical Missile Threat Kinematics

| | |
|---|---|
| Maximum speed | 580 m/sec |
| Minimum range | 500 m |

TABLE I-continued

Typical Missile Threat Kinematics

| | |
|---|---|
| Maximum range | 4800 m |
| Maximum altitude | 3500 m |
| Boost duration | 1-2 sec |
| Boost acceleration | 25 g |

At this time it should be noted that these missile threat kinematic parameters, combined with typical takeoff profiles of transport aircraft, imply that sensor coverage is necessary for corridors approximately 10 km wide and 30 to 40 km long, extending from each end of each runway in operation at an airport or airfield.

Each sensor node 22, 24, 26, 28, 32, 34, 36 and 38 has at least one and generally more than one imaging electro-optical (EO) sensors for viewing a defended area between the nodes. Many sensors were considered for detecting and localizing shoulder-fired missile launches including radar, acoustic, and imaging EO sensors covering different regions of the spectrum: ultraviolet (UV), visible, and three infrared (IR) bands corresponding to atmospheric transmission windows: near (NIR), mid-wave (MWIR), and long-wave (LWIR). Acoustic and visible-light sensors were not given serious consideration as missile launch detecting sensors, because of high background-noise levels in an urban environment. Radar systems were also rejected, because of the high cost of individual sensors and the number of radars needed to guarantee detectable Doppler shifts for all launch trajectories in a protected corridor.

A comparison of UV, MWIR, and LWIR detection ranges was made to determine the sensor which provided for optimal detection of a threat missile. The comparison procedure calculated contrast irradiance of a generic missile plume in each band, adjusted by atmospheric attenuation, and compared it with the noise-equivalent irradiance (NEI) of typical sensors being considered for grid 20 of FIG. 1. It was determined that MWIR sensor performance was far superior to the performance of UV and LWIR sensors at distances of twenty kilometers.

For sensor node 22, the field of view, which is generally semi-circular in shape in the horizontal plane and approximates a quarter circle in the vertical plane, is designated by the reference numeral 42. On the right side of flight path 30, sensor node 24 has a field of view 44; sensor node 26 has a field of view 46, and sensor node 28 has a field of view 48. On the left side of flight path 30, sensor node 32 has a field of view 52, sensor node 34 has a field of view 54, sensor node 36 has a field of view 56 and sensor node 38 has a field of view 58.

Referring again to FIG. 1, FIG. 1 depicts the aircraft departure/flight path 30 for aircraft 40 which is continuously surveyed by sensor nodes 22, 24, 26, 28, 32, 34, 36 and 38, which provide a corridor of coverage 60 coincident with aircraft flight path 30. The width of the corridor 60 is selected to provide sensor coverage for any possible threat missile launch scenario.

At this time it should be noted that there are overlaps in the sensor node fields of views (FOVs) to enable triangulation and tracking within the grid system 20. For example, field of view 42, overlaps with field of view 44 in an area of multiple sensor coverage 64.

The launch of threat missile is observable by multiple sensor nodes 22, 24, 26, 28, 32, 32, 36 and 38 at intersecting regions along flight path 30. For example, optical sensors 22, 24 and 32 share their observations with each other. The field of views 42, 44 and 52 respectively for sensors 22, 24 and 32 first intersect at point 70 along flight path 30 in FIG. 1.

The observation/detection of a threat missile by sensor nodes 22, 24 and 32 is represented as a line-of-bearing, that is a relatable angle/angle position of the threat missile relative to the sensor making the observation. To be useful to other sensor nodes within grid system 20, each sensor node 22, 24, 26, 28, 32, 34, 36 and 38 needs to report angle/angle data in an absolute form such that neighboring sensor nodes know where the threat missile is being observed. By using multiple sensor nodes 22, 24, 26, 28, 32, 34, 36 and 38 to observe a threat missile before an alert is generated there is a significant decrease in false alarms. Further, a 3-dimensional description of points along the missile trajectory is obtained through triangulation of two or more sensor nodes 22, 24, 26, 28, 32, 34, 36 and 38.

Figure 2:
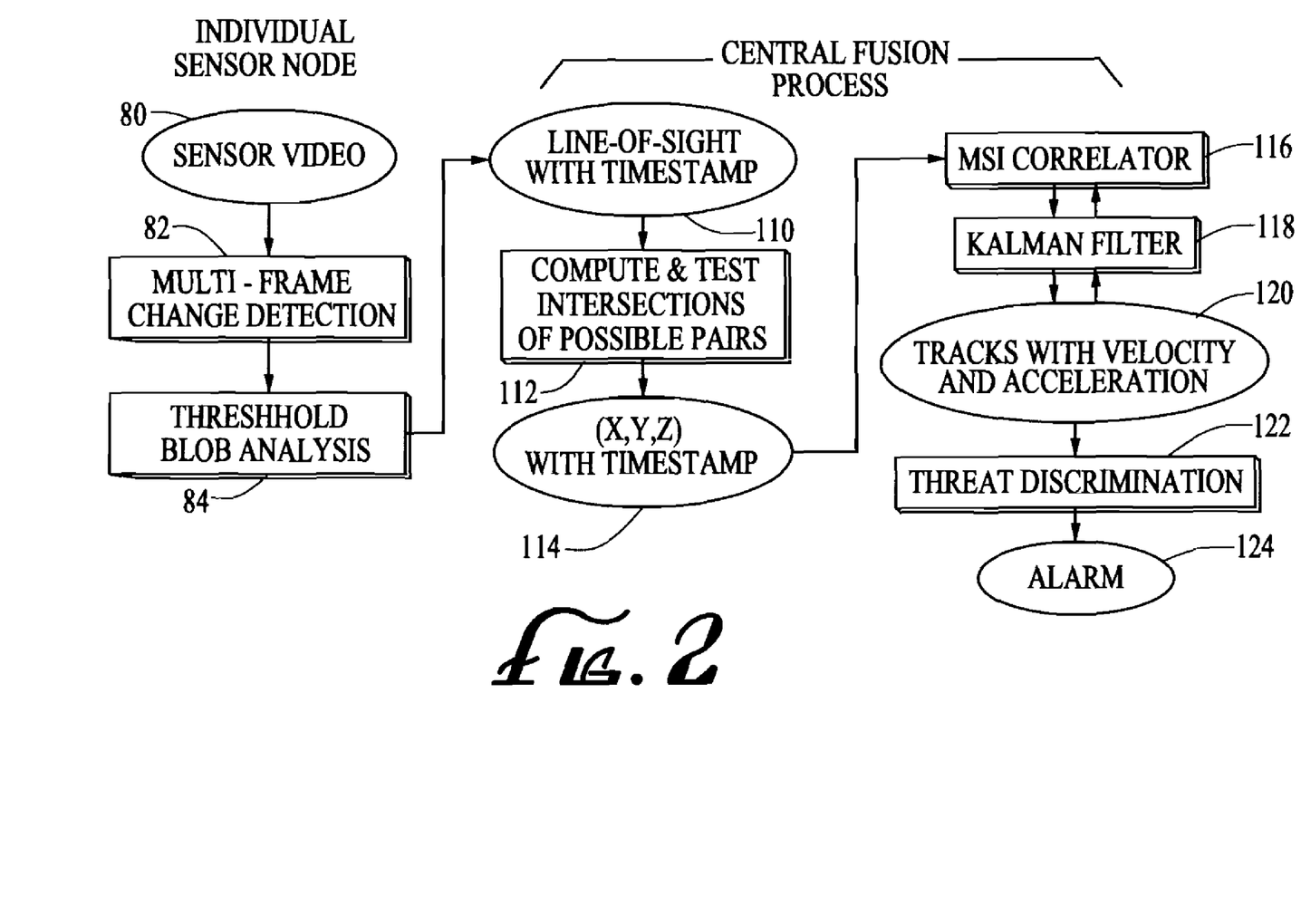
FIG. 2 is a flow chart for the distributed ground-based threat detection system processing algorithms which are used to detect and monitor the launch of a threat missile aimed at a target aircraft.

Referring to FIGS. 1 and 2, there are four main components for the distributed ground-based threat detection system processing algorithms which are used to detect and monitor the launch of a threat missile aimed at a target aircraft. The four components, which are implemented in computer software, are:

1. Single-sensor image processing of sensor video (program step 80) which consists of change detection by frame-to-frame subtraction (program step 82), followed by blob analysis, in which adjacent changed pixels are clustered and analyzed, which includes determining the pixel coordinates of their centroid (program step 84). The centroid pixel coordinates are converted to a direction in a globally referenced coordinate system.

2. Simultaneous detections from pairs of sensors with overlapping fields of view are tested for possible intersections, within pixel resolution and alignment uncertainty.

3. Three-dimensional coordinates of valid intersections are fed into a multisensor/multitarget correlation and tracking algorithm to generate fused track files.

4. The track files are monitored to determine whether any are missiles.

The first component implemented in software is single-sensor image processing consisting of acquiring sensor video (program step 80), performing frame-by-frame differencing (program step 82) and thresholding and blob analysis (program step 84). The detection of a threat missile in the coverage area of the sensor nodes 22, 24, 26, 28, 32, 34, 36 and 38 is performed by a High-Speed Capture and Detect (HSCD) algorithm. The HSCD algorithm accurately and consistently locates a missile's plume within the field of view (FOV) (e.g. FOV 42 for sensor node 22) of a digital image captured from a sensor's video (program step 80), while minimizing the effects of non-threat background clutter. For this task, the missile characteristics of importance are the high level of contrast between the plume and the background, and the motion of the plume apparent to the observing sensor node 22, 24, 26, 28, 32, 34, 36 or 38. To maximize use of these missile characteristics, the HSCD algorithm is designed to extract those objects from a scene that are bright and exhibit sufficient apparent motion.

The basic components of the HSCD algorithm are to perform change detection on the sensor video 80 to extract moving objects, which is accomplished by single-sensor image processing consisting of change detection calculated by frame-to-frame subtraction (program step 82). The HSCD algorithm then thresholds the results of this operation to extract bright objects such as the missile plume, and analyzes the results to get the position of the object in image space (program step 84). In addition, the HSCD algorithm implements a feedback loop to adjust the threshold level of future images based on the amount of clutter coming through the threshold process of program step 84.

The algorithm uses statistical sampling to implement the change detection and threshold operations of program step 84 for extracting bright, moving objects from the scene. The intensity of each pixel in a newly acquired image is examined and compared to its own recent temporal history to determine if that pixel is an outlier in the new image. If a pixel's intensity exceeds its own historical average by a certain number of standard deviations, then the pixel is thresholded as an outlier. Upon completing this process for each pixel in the new image, the algorithm leaves a binary image of outlier pixels comprising the bright, moving objects in the scene, which may include a threat missile.

The resulting binary image of outlier pixels is then analyzed to determine the shape and location of each object detected. The shape characteristics help to further filter objects that do not resemble a missile plume, while the pixel coordinates of an object's centroid are later used to map the observation to a globally referenced line-of-sight (LOS) vector.

Finally, the number of objects detected in the new image is used to adjust the threshold level, which is the number of standard deviations above the mean for the purpose of processing future images. The algorithm normally outputs a relatively constant number of detections that are specified by a system parameter. If the number of detections in the new image is below the desired amount, the threshold is lowered, allowing more objects through. Likewise, if the number of detections in the new image is above the desired amount, the threshold level is raised, filtering out more objects. This helps to maximize the probability of detection of a missile plum, especially in long-range observations, while still maintaining a reasonable processing load.

During single-sensor processing which comprises program steps 80, 82 and 84, the pixel coordinates of the detections are converted to pointing directions in a common globally referenced coordinate system. In this format, the pixel coordinates of the detections are sent to a central fusion processing node, along with a GPS-based time stamp. The first step in central processing checks time stamps to ensure that simultaneous messages within the video frame rate are being handled (program step 110).

Referring to FIG. 2, program step 112 computes and tests for intersections of possible sightline pairs.

Figure 3:
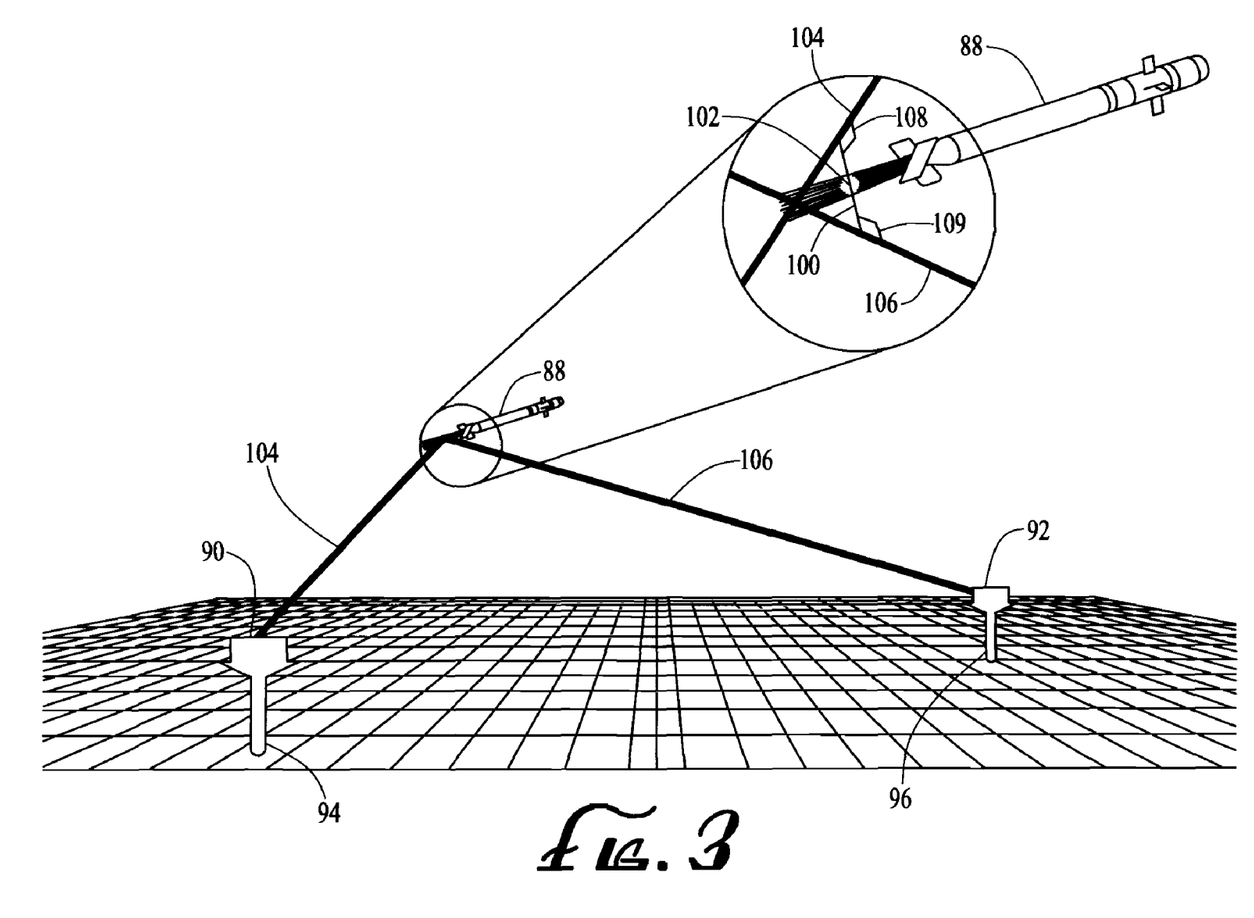
FIG. 3 illustrates a sightline correlation wherein a missile's position is calculated as a midpoint of the shortest line segment connecting the detection sightlines from a pair of sensors at different locations.

Referring to FIG. 3, for each pair of imaging EO sensors 90 and 92, which are located at different sensor node locations 94 and 96, every possible combination of sightlines is tested for intersection. As previously discussed, each sensor node 94 and 96 has at least one sensor and generally more than one sensor located at the sensor node 94 or 96. Sightlines from co-located sensors at a sensor node 94 or 96 intersect at the sensor node position.

Sightline correlation for a target/missile 88 is calculated in the following manner. The shortest line segment 100 connecting two detection sightlines 104 and 106 is perpendicular to both of the detection sightlines 104 and 106, such that the line segment's direction is determined by the cross product of the two sightline unit vectors for sightlines 104 and 106. Angles 108 and 109 are ninety degrees.

Once this is calculated, the intersection points is found by solving a system of three linear equations in three unknowns. A valid intersection is one for which the length of line segment 100 is not significantly greater than that subtended by the pixel size of the more distant sensor 92. The midpoint 102 of the line segment 100 is used as the target coordinate for missile 88 which is sent to a multisensor tracker.

For each midpoint 102, program step 114 generates a 3-D X, Y, Z coordinate of a point in space, plus an observation time.

Although this sightline correlation is a relatively simple calculation, it is implemented as an independent computer program, so that it runs in a dedicated processor, in anticipation of the need to handle large numbers of single-sensor clutter events.

The multisensor tracker process comprises program steps 116, 118, 120 and 122, and generates fused track files from single-frame intersections.

In the distributed ground-based threat detection system implementation, the set of intersections produced by each pair of sensors is treated as the detections of a single logical sensor. Each time a message is received from a single logical sensor, the following steps are performed during program steps 116, 118, 120 and 122:

1. Existing fused track files are extrapolated to the current time, provided that a video frame time has elapsed since the last extrapolation. Sensors with no current detections generate messages containing only the time stamp (program step 116).

2. A correlation matrix is filled with standard differences between the sensor detection x, y, z coordinates and the fused track position estimates (program step 116).

3. A best-first heuristic algorithm assigns one-to-one matches between tracks and detections. The best match is defined as the one with the least competition from other possible matches in the same row or column of the correlation matrix (program step 116).

4. A Kalman filter is used to update matched tracks with the new detection information (program step 118).

5. Unmatched detections are copied into new track files. Fused track files which have not been matched for a significant fraction of their lifetime are deleted.

The original version of the multisensor tracker, or multi-source integration (MSI) used a conventional Kalman filter with a state vector consisting of position and velocity in Cartesian coordinates. The Kalman filter currently in use is a version of the Bierman-Thornton U-D filter. The U-D filter estimates acceleration as well as position and velocity, for improved threat declaration performance (program step 120).

Threat declaration is performed in program step 122. A relatively simple technique for determining whether a target is a missile is to utilize speed and acceleration thresholds. The magnitude of the velocity or acceleration estimated by the Kalman filter is required to exceed its respective threshold by at least one standard deviation. The threshold levels are chosen to be significantly greater than the velocity or acceleration of any aircraft in a takeoff/landing corridor. This relatively simple threshold approach consistently produces threat declarations within a few seconds (e.g. 2-4 seconds) after the launch of a missile 88 (FIG. 3). Threat declaration 122 is output to an alarm 124.

Figure 4:
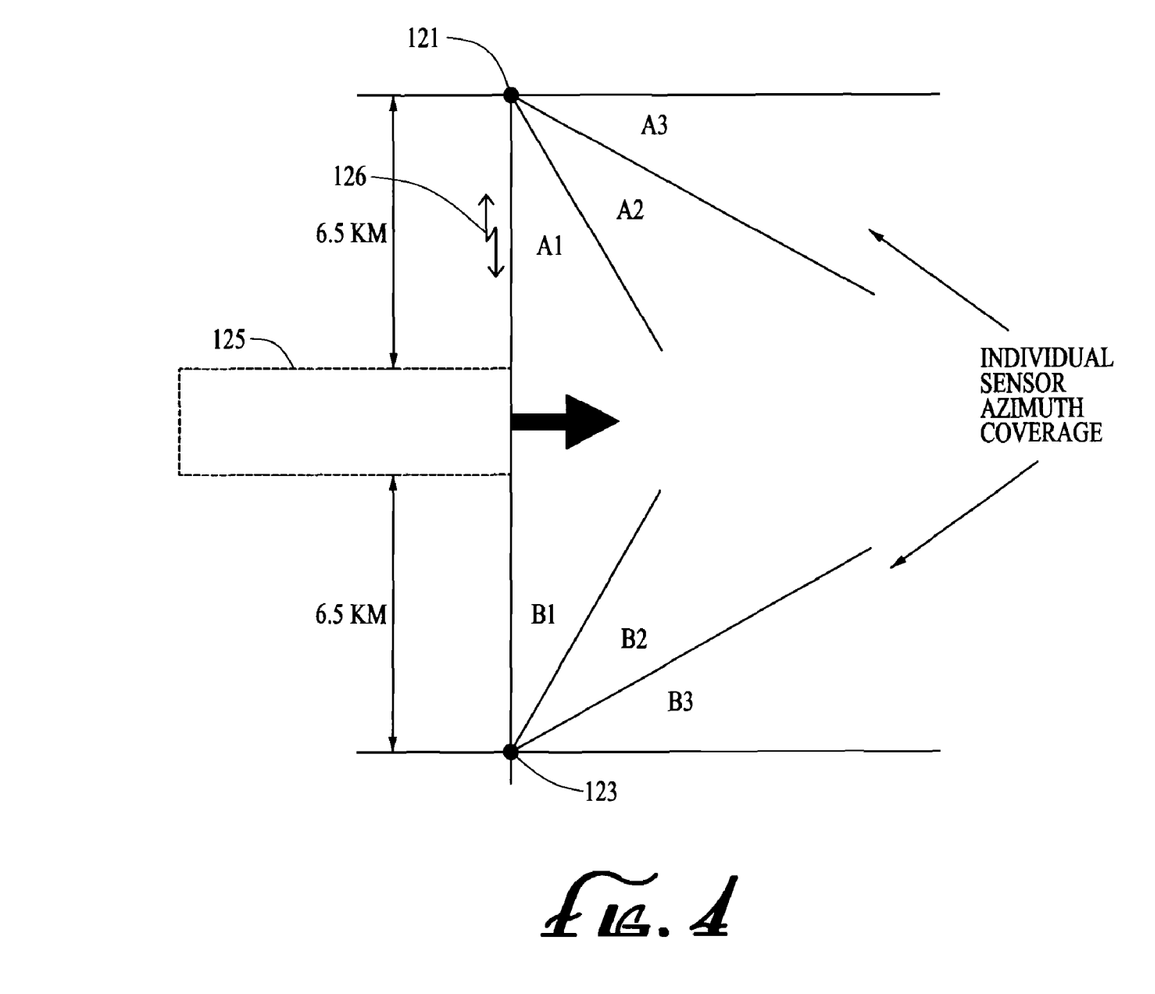
FIG. 4 is a schematic diagram of a demonstration system's geometry for testing the distributed ground-based threat detection system processing algorithms.

Referring to FIG. 4, a diagram of the demonstration system geometry shows that sensor node 121 is the master node, which has the central fusion processing equipment, and sensor node 123 is a remote node with only single-sensor processing equipment. The sensor nodes 121 and 123 are located approximately 13.5 kilometers apart from each other and 6.5 kilometers from runway 125. Each node 121 and 123 has three MWIR cameras for tracking a threat missile. For sensor node 120, the three MWIR cameras horizontal field of views are designated A1, A2 and A3 and cover approximately ninety degrees combined. For sensor node 123, the three MWIR cameras horizontal field of views are designated B1, B2 and B3 and also cover approximately ninety degrees combined.

Since each individual camera has a horizontal field of view of about 35 degrees, there is significant overlap of about eight degrees in coverage between co-located cameras at each sensor node 121 and 123. The cameras are housed in range-instrumentation dome shelters, which can be completely closed for environmental protection when the system is not in operation.

Communication between the sensor nodes 121 and 123 is via a two-way microwave datalink 126, with an operating frequency in the range of 7125 to 8400 MHz. The two-way microwave datalink 126 includes an Ethernet interface which has a data rate of 100 Mb/sec. In addition, the microwave datalink 126 provides for two-way voice channels. Each node 121 and 123 is also equipped with a GPS receiver and timing processor for data time-tagging and synchronization, and a microwave datalink antenna for signal transmission between sensor nodes.

In order to make accurate comparisons with range instrumentation and to optimize system performance it was necessary to make accurate measurements of the true line-of-sight directions of the sensor pixels. This was a two-stage process. Before system integration, the field of view of each camera was mapped on an optical bench with a collimated source. Significant pincushion distortion was observed, which was up to 1.5 degrees near the edges of the field of view for each MWIR camera. To allow conversion from pixel coordinates to true sightlines, the optical distortion observed was fitted to cubic polynomials, which were converted to lookup tables for use by the real-time image processing.

In their shelters at each sensor node 121 and 123, the cameras were attached to a rigid pedestal and mounting plate assembly. The second stage in determining the true line-of-sight directions of the sensor pixels involved determining their orientation with respect to a global coordinate system. The pixel coordinates of these observations, combined with an optical distortion map provided the global orientation of each sensor.

Figure 5:
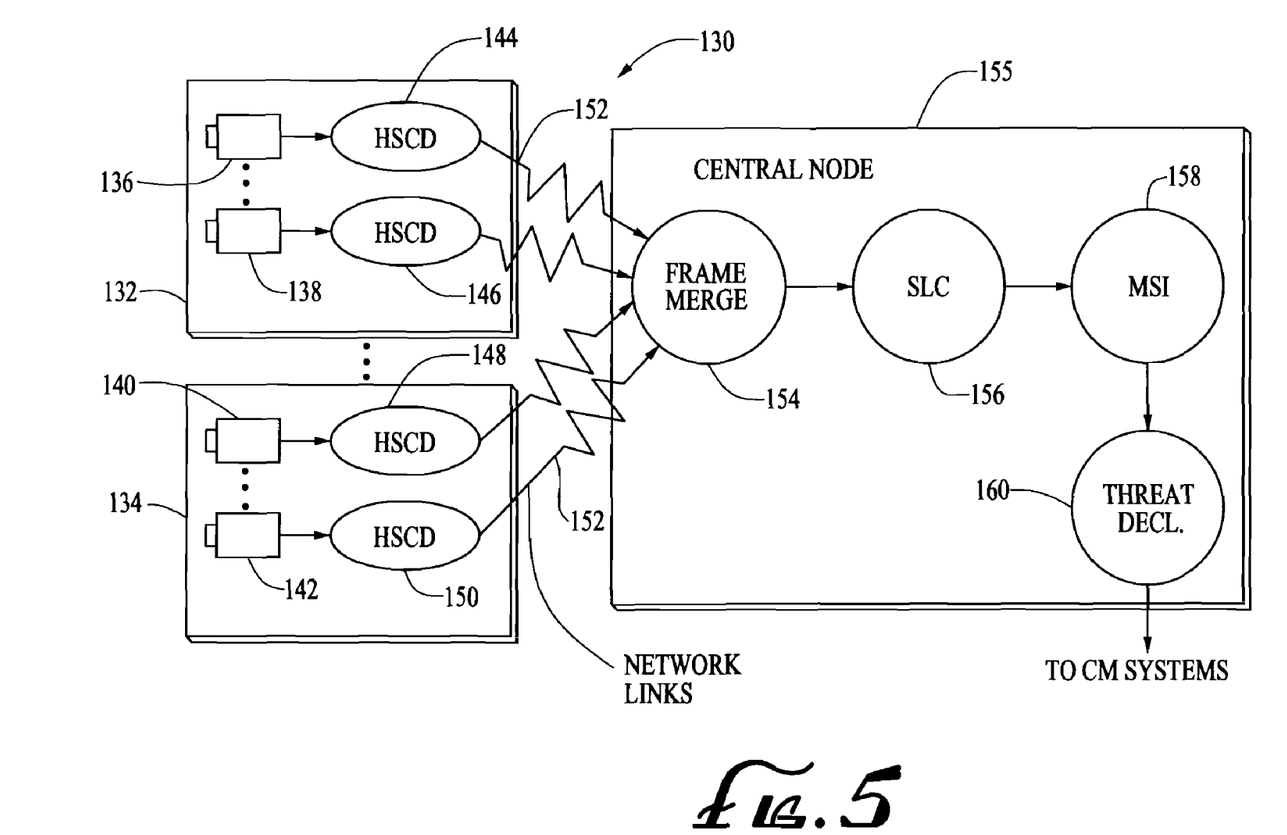
FIG. 5 illustrates an information flow diagram for a demonstration system's geometry for testing the distributed ground-based sensor threat detection system.

FIG. 5 illustrates a distributed ground-based threat detection system information flow diagram 130. The flow diagram 130 depicts remote node 132 as having imaging EO sensors 136 and 138, and remote node 134 as imaging EO sensors 140 and 142. Each sensor is connected to an HSCD image processor. For example, at node 132, sensor 136 is connected to HSCD image processor 144 and sensor 138 is connected to HSCD image processor 146. Similarly, at node 134, sensor 140 is connected to HSCD image processor 148 and sensor 142 is connected to HSCD image processor 150.

Each of the HSCD image processors 144, 146, 148 and 150 transfers information via a high-bandwidth network link 152 to a frame merge module 154 within a central node 155. This network link may be wired copper or fiber optic, or may be wireless. The frame merge module 154, which is in a dedicated processor, receives detection messages from all of the HSCD image processors 144, 146, 148 and 150 and compares GPS time stamps to ensure that synchronized pairs of video frames are sent to the sightline correlator (SLC) 156 within central node 155.

Although the sightline correlation is a very simple calculation, sightline correlator 156 is implemented as an independent computer program, so that it could run in a dedicated processor, in anticipation of the need to handle large numbers of single-sensor clutter events.

The output of sightline correlator 156, which is used to calculate target or missile position in the manner illustrated in FIG. 3, is sent to an MSI tracker 158. A U-D filter, which estimates position, velocity and acceleration is being utilized for improved threat declaration performance.

The output of MSI tracker 158 is provided to threat declaration module 160 which compares track dynamics with missile flight profiles to determine if a threat missile has been launched against an aircraft.

When the threat declaration module 160 determines that a threat missile has been launched, a launch confirmed signal is sent to a countermeasures system which is used either to trigger release of countermeasures by the aircraft under attack, or to cue a ground-based countermeasures system to defeat the threat missile.

What is claimed is:

1. A method for detecting a launch and flight of a missile which is targeted at aircraft traveling along a takeoff and landing path at an airfield comprising the steps of:
   (a) monitoring the launch and flight of said missile which is targeted at the aircraft traveling along said takeoff and landing path, wherein a plurality of imaging EO sensors monitor the launch and flight of said missile;
   (b) generating video data of the launch and flight of said missile, wherein each of said plurality of EO sensors generate said video data;
   (c) digitizing and processing said video data from each of said EO sensors to determine when a plume of said missile is within a field of view for said EO sensor;
   (d) generating sightline data for each of said EO sensors representing a line of sight from said EO sensor to the plume of said missile;
   (e) transferring said sightline data for each of said EO sensors to a central processor;
   (f) processing said sightline data for each of said EO sensors to determine when the line of sight for one of a pair of EO sensors having overlapping field of views intersects with the line of sight for the other of said pair of EO sensors to provide one of a plurality of data points for said missile during the launch and flight of said missile, wherein said central processor includes a sightline correlator for processing said sightline data from each of said pair of EO sensors having said overlapping field of views to locate each of said plurality of data points for said missile;
   (g) correlating and combining said plurality of data points to provide estimates of position, velocity and acceleration for said missile, and enhanced threat declaration performance;
   (h) comparing track dynamics including said estimates of position, velocity and acceleration for said missile with missile flight profiles to determine if said missile is a threat missile launched against one of said aircraft; and
   (i) generating a launch confirmed signal sent to a countermeasures system when said threat declaration module determines that said threat missile is being launched against said aircraft.

2. The method of claim 1 further comprising the step of responding to said launch confirmed signal, triggering release of countermeasures by the aircraft under attack, wherein said countermeasures system, responsive to said launch confirmed signal, triggers release of said countermeasures by the aircraft under attack.

3. The method of claim 1 further comprising the step of responding to said launch confirmed signal, activating a ground-based countermeasures system to defeat the threat missile, wherein said launch confirmed signal activates said ground-based countermeasures system to defeat the threat missile.

4. The method of claim 1 further comprising the step of providing a network link to transfer said sightline data for each of said EO sensors to said central processor.

5. The method of claim 1 further comprising the step of providing a plurality of High-Speed Capture and Detect (HSCD) processors wherein each of said HSCD processors is connected to one of said EO sensors to receive said video data from said EO sensor connected thereto, said HSCD processor digitizing and processing said video data to determine when the plume of said missile is within the field of view of said EO sensor, said HSCD processor then generating sight said line data representing the line of sight from said EO sensor to the plume of said missile.

6. The method of claim 1 further comprising the step of providing a plurality of remote sensor nodes located in the vicinity of said takeoff and landing path, each of said remote sensor nodes having at least one of said EO sensors located at said remote sensor node, each of said remote sensor nodes communicating with said central processor via a network link and transferring said sightline data for each of said EO sensors at each of said remote sensor nodes to said central processor via said network link.

7. The method of claim 6 wherein said plurality of remote sensor nodes are located and orientated in the vicinity of said takeoff and landing path such that a volume requiring surveillance is viewable by said EO sensors from at least two of said remote sensor nodes in a sensor grid of said remote sensor nodes, said volume requiring surveillance comprising a region surrounding said takeoff and landing path where said threat missile is within a lethal range of said aircraft when said aircraft is along said takeoff and landing path.

8. The method of claim 6 further comprising the step of providing a two-way microwave datalink between said remote sensor nodes for communicating between said remote sensor nodes, wherein said two-way microwave datalink has an operating frequency in the range of 7125 to 8400 MHz and an Ethernet interface which has a data rate of 100 Mb/sec.

9. The method of claim 1 further comprising the step of providing said sightline correlator for correlating and combining said plurality of data points to provide said estimates of position, velocity and acceleration for said missile, and enhanced threat declaration performance.

10. A method for detecting a launch and flight of a missile which is targeted at aircraft traveling along a takeoff and landing path at an airfield comprising the steps of:
(a) monitoring the launch and flight of said missile which is targeted at the aircraft traveling along said takeoff and landing path, wherein a plurality of imaging EO sensors monitor the launch and flight of said missile;
(b) generating video data of the launch and flight of said missile, wherein each of said plurality of EO sensors generate said video data;
(c) digitizing and processing said video data from each of said EO sensors to determine when a plume of said missile is within a field of view for said EO sensor;
(d) generating sightline data for each of said EO sensors representing a line of sight from said EO sensor to the plume of said missile;
(e) transferring said sightline data for each of said EO sensors to a central processor;
(f) processing said sightline data for each of said EO sensors to determine when the line of sight for one of a pair of EO sensors having overlapping field of views intersects with the line of sight for the other of said pair of EO sensors to provide one of a plurality of data points for said missile during the launch and flight of said missile, wherein said central processor includes a sightline correlator for processing said sightline data from each of said pair of EO sensors having said overlapping field of views to locate each of said plurality of data points for said missile;
(g) correlating and combining said plurality of data points to provide estimates of position, velocity and acceleration for said missile, and enhanced threat declaration performance;
(h) comparing track dynamics including said estimates of position, velocity and acceleration for said missile with missile flight profiles to determine if said missile is a threat missile launched against one of said aircraft;
(i) generating a launch confirmed signal sent to a countermeasures system when said threat declaration module determines that said threat missile is being launched against said aircraft;
(j) providing a plurality of remote sensor nodes located in the vicinity of said takeoff and landing path, each of said remote sensor nodes having at least one of said EO sensors located at said remote sensor node, each of said remote sensor nodes communicating with said central processor via a network link and transferring said sightline data for each of said EO sensors at each of said remote sensor nodes to said central processor via said network link, wherein said network link is selected from a group of high-bandwidth network links consisting of wired copper network links, fiber optic network links, and wireless network links;
(k) providing a two-way microwave datalink between said remote sensor nodes for communicating between said remote sensor nodes, wherein said two-way microwave datalink has an operating frequency in the range of 7125 to 8400 MHz and an Ethernet interface which has a data rate of 100 Mb/sec;
(l) providing a two-way voice channel between said remote sensor nodes for communicating between said remote sensor nodes wherein said two-way voice channel is included within said two-way microwave datalink between said remote sensor nodes; and
(m) responding to said launch confirmed signal by activating said countermeasures system to defeat the threat missile, wherein said launch confirmed signal activates said countermeasures system to defeat the threat missile and said countermeasures system comprises a ground-based countermeasure system.

11. The method of claim 10 further comprising the step of responding to said launch confirmed signal by triggering release of countermeasures by the aircraft under attack, wherein said countermeasures system, responsive to said launch confirmed signal, triggers release of said countermeasures by the aircraft under attack.

12. The method of claim 10 further comprising the step of providing a plurality of High-Speed Capture and Detect (HSCD) processors wherein each of said HSCD processors is connected to one of said EO sensors to receive said video data from said EO sensor connected thereto, said HSCD processor digitizing and processing said video data to determine when the plume of said missile is within the field of view of said EO sensor, said HSCD processor then generating sight said line data representing the line of sight from said EO sensor to the plume of said missile, each of said HSCD processor being located at one of said remote sensor nodes.

13. The method of claim 10 wherein said plurality of remote sensor nodes are located and orientated in the vicinity of said takeoff and landing path such that a volume requiring surveillance is viewable by said EO sensors from at least two of said remote sensor nodes in a sensor grid of said remote sensor nodes, said volume requiring surveillance comprising a region surrounding said takeoff and landing path where said threat missile is within a lethal range of said aircraft when said aircraft is along said takeoff and landing path.

14. The method of claim 10 further comprising the step of providing said sightline correlator for correlating and combining said plurality of data points to provide said estimates of position, velocity and acceleration for said missile, and enhanced threat declaration performance.

15. A method for detecting a launch and flight of a missile which is targeted at aircraft traveling along a takeoff and landing path at an airfield comprising the steps of:
  (a) monitoring the launch and flight of said missile which is targeted at the aircraft traveling along said takeoff and landing path, wherein a plurality of imaging EO sensors monitor the launch and flight of said missile;
  (b) generating video data of the launch and flight of said missile, wherein each of said plurality of EO sensors generate said video data;
  (c) digitizing and processing said video data from each of said EO sensors to determine when a plume of said missile is within a field of view for said EO sensor;
  (d) generating sightline data for each of said EO sensors representing a line of sight from said EO sensor to the plume of said missile;
  (e) transferring said sightline data for each of said EO sensors to a central processor;
  (f) processing said sightline data for each of said EO sensors to determine when the line of sight for one of a pair of EO sensors having overlapping field of views intersects with the line of sight for the other of said pair of EO sensors to provide one of a plurality of data points for said missile during the launch and flight of said missile, wherein said central processor includes a sightline correlator for processing said sightline data from each of said pair of EO sensors having said overlapping field of views to locate each of said plurality of data points for said missile;
  (g) correlating and combining said plurality of data points to provide estimates of position, velocity and acceleration for said missile, and enhanced threat declaration performance;
  (h) providing a sightline correlator for correlating and combining said plurality of data points to provide said estimates of position, velocity and acceleration for said missile, and enhanced threat declaration performance;
  (i) comparing track dynamics including said estimates of position, velocity and acceleration for said missile with missile flight profiles to determine if said missile is a threat missile launched against one of said aircraft;
  (j) generating a launch confirmed signal sent to a countermeasures system when said threat declaration module determines that said threat missile is being launched against said aircraft;
  (k) providing a plurality of remote sensor nodes located in the vicinity of said takeoff and landing path, each of said remote sensor nodes having at least one of said EO sensors located at said remote sensor node, each of said remote sensor nodes communicating with said central processor via a network link and transferring said sightline data for each of said EO sensors at each of said remote sensor nodes to said central processor via said network link, wherein said network link is selected from a group of high-bandwidth network links consisting of wired copper network links, fiber optic network links, and wireless network links;
  (l) providing a two-way microwave datalink between said remote sensor nodes for communicating between said remote sensor nodes, wherein said two-way microwave datalink has an operating frequency in the range of 7125 to 8400 MHz and an Ethernet interface which has a data rate of 100 Mb/sec;
  (m) providing a two-way voice channel between said remote sensor nodes for communicating between said remote sensor nodes wherein said two-way voice channel is included within said two-way microwave datalink between said remote sensor nodes;
  (n) responding to said launch confirmed signal by activating said countermeasures system to defeat the threat missile, wherein said launch confirmed signal activates said countermeasures system to defeat the threat missile; and
  (o) providing a frame merge module wherein said frame merge module is a dedicated processor for receiving detection messages from said remote sensor nodes which include said sightline data and comparing GPS time stamps to ensure that synchronized pairs of video frames are sent to said sightline correlator.

16. The method of claim 15 further comprising the step of responding to said launch confirmed signal by triggering release of countermeasures by the aircraft under attack, wherein said countermeasures system, responsive to said launch confirmed signal, triggers release of said countermeasures by the aircraft under attack.

17. The method of claim 15 further comprising the step of providing a plurality of High-Speed Capture and Detect (HSCD) processors wherein each of said HSCD processors is connected to one of said EO sensors to receive said video data from said EO sensor connected thereto, said HSCD processor digitizing and processing said video data to determine when the plume of said missile is within the field of view of said EO sensor, said HSCD processor then generating sight said line data representing the line of sight from said EO sensor to the plume of said missile, each of said HSCD processor being located at one of said remote sensor nodes.

18. The method of claim 15 wherein said plurality of remote sensor nodes are located and orientated in the vicinity of said takeoff and landing path such that a volume requiring surveillance is viewable by said EO sensors from at least two of said remote sensor nodes in a sensor grid of said remote sensor nodes, said volume requiring surveillance comprising a region surrounding said takeoff and landing path where said threat missile is within a lethal range of said aircraft when said aircraft is along said takeoff and landing path.

19. The method of claim 15 further comprising the step of providing a multi-source integration (MSI) tracker for receiving the output of said sightline correlator, said MSI tracker including a Bierman-Thornton U-D filter which estimates the acceleration and the position and velocity of said missile for substantially improved threat declaration performance.

20. The method of claim 19 further comprising the step of providing a threat declaration module for receiving the output of MSI tracker wherein said threat declaration module wherein said threat declaration module compares track dynamics with missile flight profiles to determine when said threat missile is launched against said aircraft.

* * * * *